US008490058B2

(12) United States Patent
Rapp et al.

(10) Patent No.: US 8,490,058 B2
(45) Date of Patent: Jul. 16, 2013

(54) TIME-BASED NAVIGATION WITHIN RESOURCE UTILIZATION DATA

(75) Inventors: James Rapp, Redmond, WA (US); Daniel Griffing, Covington, WA (US); Alexander Dadiomov, Redmond, WA (US); Matthew Jacobs, Seattle, WA (US); Hazim Shafi, Redmond, WA (US); Ryan Nowak, Bellevue, WA (US); Ben Nesson, Seattle, WA (US); Drake A. Campbell, Seattle, WA (US); Mayank Agarwal, Bellevue, WA (US); Paulo Cesar Sales Janotti, Issaquah, WA (US); Xinhua Ji, Redmond, WA (US); George Essex Englebeck, Issaquah, WA (US); Vikram Bapat, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 35 days.

(21) Appl. No.: 13/324,444

(22) Filed: Dec. 13, 2011

(65) Prior Publication Data

US 2013/0152051 A1 Jun. 13, 2013

(51) Int. Cl.
 *G06F 9/44* (2006.01)
 *G06F 11/00* (2006.01)
(52) U.S. Cl.
 USPC ............... 717/125; 717/127; 714/25; 714/45; 714/46; 714/47.1
(58) Field of Classification Search
 USPC ........................................................ 717/125
 See application file for complete search history.

(56) References Cited

U.S. PATENT DOCUMENTS

| 5,483,468 | A  | * | 1/1996 | Chen et al. ................... 702/186 |
|---|---|---|---|---|
| 5,794,047 | A  | * | 8/1998 | Meier ........................... 717/133 |
| 6,226,787 | B1 | * | 5/2001 | Serra et al. .................... 717/125 |
| 6,332,212 | B1 | * | 12/2001 | Organ et al. ................... 717/128 |
| 6,785,893 | B2 | * | 8/2004 | Morris et al. ................. 719/318 |
| 7,343,563 | B2 | * | 3/2008 | Muratori et al. .............. 715/772 |
| 7,511,712 | B1 |   | 3/2009 | Johns |
| 8,255,876 | B2 | * | 8/2012 | Drukman et al. ............. 717/125 |
| 8,352,904 | B2 | * | 1/2013 | Hodges ........................ 717/101 |
| 2003/0126144 | A1 | * | 7/2003 | O'Halloran et al. .......... 707/100 |

(Continued)

OTHER PUBLICATIONS

Shafi, Hazim, Performance Tuning with the Concurrency Visualizer in Visual Studio, Thread Diagnostics, Retrieved Jul. 15, 2011 http://msdn.microsoft.com/en-us/magazine/ee336027.aspx.

(Continued)

*Primary Examiner* — Don Wong
*Assistant Examiner* — Marina Lee
(74) *Attorney, Agent, or Firm* — Workman Nydegger

(57) ABSTRACT

The present invention extends to methods, systems, and computer program products for time-based navigation within resource utilization data. A computer system is configured to present resource utilization data representing performance of computer resources. The resource utilization data is displayed on a diagnostic data trace during the execution of the application. The user can select a desired time range and the resource utilization data within the time range will be displayed at other traces. The diagnostic data trace is still presented so that the user can understand the relation between the selected time range and the overall time length. Further, the user can modify the selected time range by change the extents of the selected time range using resizing tool. The resource utilization data within the modified selected time range, similarly, is also displayed along with the diagnostic data trace.

20 Claims, 4 Drawing Sheets

U.S. PATENT DOCUMENTS

| | | | | |
|---|---|---|---|---|
| 2005/0108643 | A1* | 5/2005 | Schybergson et al. | 715/713 |
| 2005/0144190 | A1* | 6/2005 | Wada | 707/102 |
| 2005/0187943 | A1* | 8/2005 | Finke-Anlauff et al. | 707/100 |
| 2006/0048101 | A1 | 3/2006 | Krassovsky | |
| 2006/0156237 | A1 | 7/2006 | Williams | |
| 2008/0022843 | A1* | 1/2008 | Drukman et al. | 84/609 |
| 2009/0319984 | A1* | 12/2009 | Hodges | 717/105 |
| 2009/0319996 | A1* | 12/2009 | Shafi et al. | 717/125 |
| 2010/0017740 | A1 | 1/2010 | Gonzalez Veron et al. | |

OTHER PUBLICATIONS

"Monitoring Nodes", Aug. 2, 2010 http://technet.microsoft.com/en-us/library/ff919347%28WS.10%29.aspx.

"ANTS Performance Profiler" Retrieved Date: Jul. 15, 2011 http://www.red-gate.com/supportcenter/Content?p=ANTS%20Performance%20Profiler&c=ANTS_Performance_Profiler/help/6.1/app_Working_with_the_time_line.htm&toc=ANTS_Performance_Profiler/help/6.1/toc1253727.htm\.

Kjellkod, "Using the Monitoring Dashboard" Retrieved Date: Jul. 15, 2011 http://download.oracle.com/docs/cd/E14571_01/web.1111/e13714/dashboard.htm.

Kjellkod, "Moving Around in the Timeline" Retrieved Date: Jul. 15, 2011 http://documentation.apple.com/en/soundtrackpro/usermanual/index.html#chapter=6%26section=4%26tasks=true.

Kjellkod, "WPF Data Visualization Zoombar Control" Retrieved Date: Jul. 15, 2011 http://www.infragistics.com/dotnet/netadvantage/wpf/data-visualization/xam-zoom-bar.aspx#.

Charles, "Visual Studio 11 Developer Preview: Concurrency Visualizer", Sep. 16, 2011, 1 page. http://channe19.msdn.com/posts/Visual-Studio-vNext-Concurrency-Visualizer.

JADER3rd, "Profiling DirectX Activity", Sep. 23, 2011, 2 pages. http://blogs.msdn.com/b/visualizeparallel/archive/2011/09/23/profiling-directx-usage.aspx.

JADER3rd, "I Know I'm Doing More File I/O Than This", Sep. 21, 2011, 3 pages. http://blogs.msdn.com/b/visualizeparallel/archive/2011/09/21/i-know-i-m-doing-more-file-i-o-than-this.aspx.

JADER3rd, "How Can Visual Studio 11 Developer Preview Visualize the Behavior of a Multithreaded Application", Sep. 19, 2011, 2 pages. http://blogs.msdn.com/b/visualizeparallel/archive/2011/09/19/how-can-visual-studio-11-developer-preview-visualize-behavior-of-a-multithreaded-application.aspx.

* cited by examiner ably and/or to optimize the overall performance accordingly. Some tools for software developers provide a user interface and display the hardware execution information on a time axis. Specifically, the user interface can display the information within a time period chosen by the software developer.

TIME-BASED NAVIGATION WITHIN RESOURCE UTILIZATION DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

During the development, software developers often monitor the hardware execution information of the relevant computer components in order to make sure that the application is working properly and/or to optimize the overall performance accordingly. Some tools for software developers provide a user interface and display the hardware execution information on a time axis. Specifically, the user interface can display the information within a time period chosen by the software developer.

However, user interfaces for these types of tools can lack the ability to display the relation between the chosen time period and the overall time scale. As a result, it can be difficult to provide the software developer an intuitional way to understand the timing of a certain event during the overall computer performance.

BRIEF SUMMARY

The present invention extends to methods, systems, and computer program products for time-based navigation within resource utilization data. A diagnostic data trace is displayed at a display device. The diagnostic data trace includes resource utilization data. A current visible time range is selected within the diagnostic data trace. Resource utilization data within the current visible time ranges is presented along with the diagnostic data trace at the display device. Each extent of the current visible time range has a resizing control displayed on the diagnostics data trace.

The current visible time range is modified to create a new visible time range (e.g., in response to selection of the new visible time range). In some embodiments, at least one the extents of the current visible time range is changed to a corresponding extent of the new visible range. Resource utilization data within the new visible time range is displayed along with the diagnostic data trace at the display device. Each extent of the new visible time range has a resizing control displayed on the diagnostics data trace.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
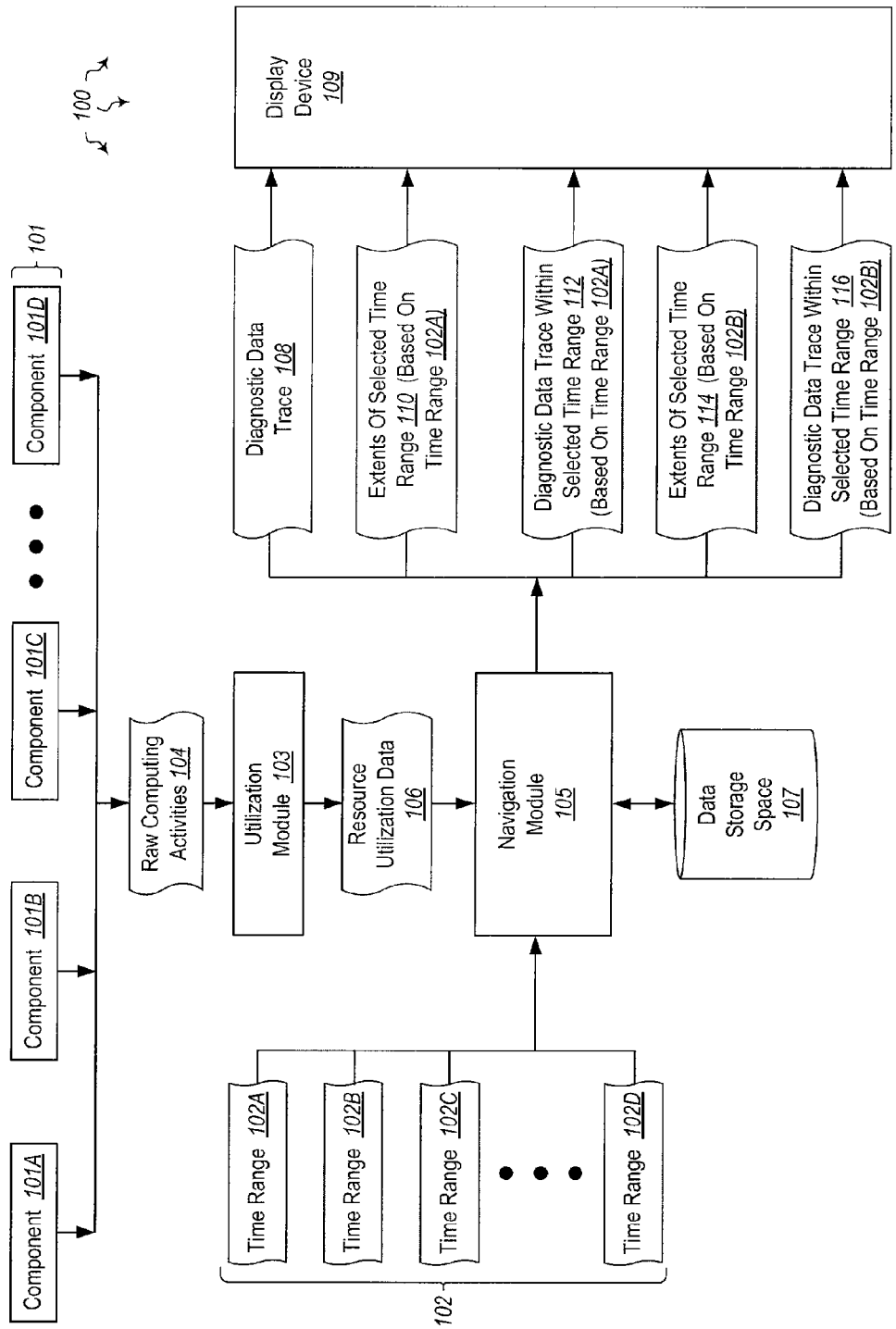
FIG. 1 illustrates an example computer architecture that facilitates time-based navigation within resource utilization data.

The present invention extends to methods, systems, and computer program products for time-based navigation within resource utilization data.

A diagnostic data trace is displayed at a display device. The diagnostic data trace includes resource utilization data. A current visible time range is selected within the diagnostic data trace. Resource utilization data within the current visible time ranges is presented along with the diagnostic data trace at the display device. Each extent of the current visible time range has a resizing control displayed on the diagnostics data trace.

The current visible time range is modified to create a new visible time range (e.g., in response to selection of the new visible time range). In some embodiments, at least one the extents of the current visible time range is changed to a corresponding extent of the new visible range. Resource utilization data within the new visible time range is displayed along with the diagnostic data trace at the display device. Each extent of the new visible time range has a resizing control displayed on the diagnostics data trace.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates time-based navigation within resource utilization data. Referring to FIG. 1, computer architecture 100 includes components 101 (101A-101D). The ellipses between 101C and 101D represents that that are one or more additional components can exist. Thus, there may be as few as two such components, but there might also be as many as thousands or perhaps more components. Accordingly, FIG. 1 should only be interpreted as an example of multi-components computer architecture.

Each of the depicted components may be separate independent computer systems or computer components of a single computer system. For example, components 101 can be GPUs, hard disks, CPUs, or even cores of a CPU.

Each of the depicted components is physically connected or connected to one another over (or is part of) a network, such as, for example, a Local Area Network ("LAN"), a Wide Area Network ("WAN"), and even the Internet. Accordingly, each of the depicted components as well as any other connected components and their sub-components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted in FIG. 1, computer architecture 100 includes utilization module 103, navigation module 105, data storage space 107, and display device 109. Components 101 can output raw computing activities 104. Utilization module 103 is configured to receive raw computing activities 104 from components 101. Raw computing activities 104 may be any type of computing activities, including reading or writing operations to hard disks, calculations by CPU, or transmissions of data over a network. Upon receiving raw computing activities 104, utilization module 103 can generate resource utilization data 106 based on raw computing activities 104. Resource utilization data 106 can indicate different performances of components 101 including executions, synchronizations, input/output operations, sleep time, memory management, preemption, or UI processing.

In some embodiments, navigation module 105 generates diagnostic data trace 108 and submits diagnostic data trace 108 to display device 109. Diagnostic data trace 108 can include resource utilization data 106. In addition, the navigation module 105 can receive different time ranges 102. A user can select the time range, for example, when the details of the resource utilization data within the time range are of interest. Four time ranges (102A, 102B, 102C, and 102D) are illustrated in FIG. 1. However, the ellipses represents that other time ranges can exist.

In one embodiment, upon receiving time range 102A, navigation module 105 submits extents 110 of selected time range (102A) together with the diagnostic data trace within selected time range 112 to display device 109. Once the user chooses another time range, as an example, 102B, navigation module 105 submits extents 114 of the extents of the newly selected time range (102B) and the diagnostic data trace within newly selected time range 116 to display device 109.

In one embodiment, navigation module 105 may communicate with data storage space 107. Data storage space 107 may store resource utilization data 106, time ranges 102, or diagnostic data trace 108 and provides such information upon the request from navigation module 105.

Figure 2:
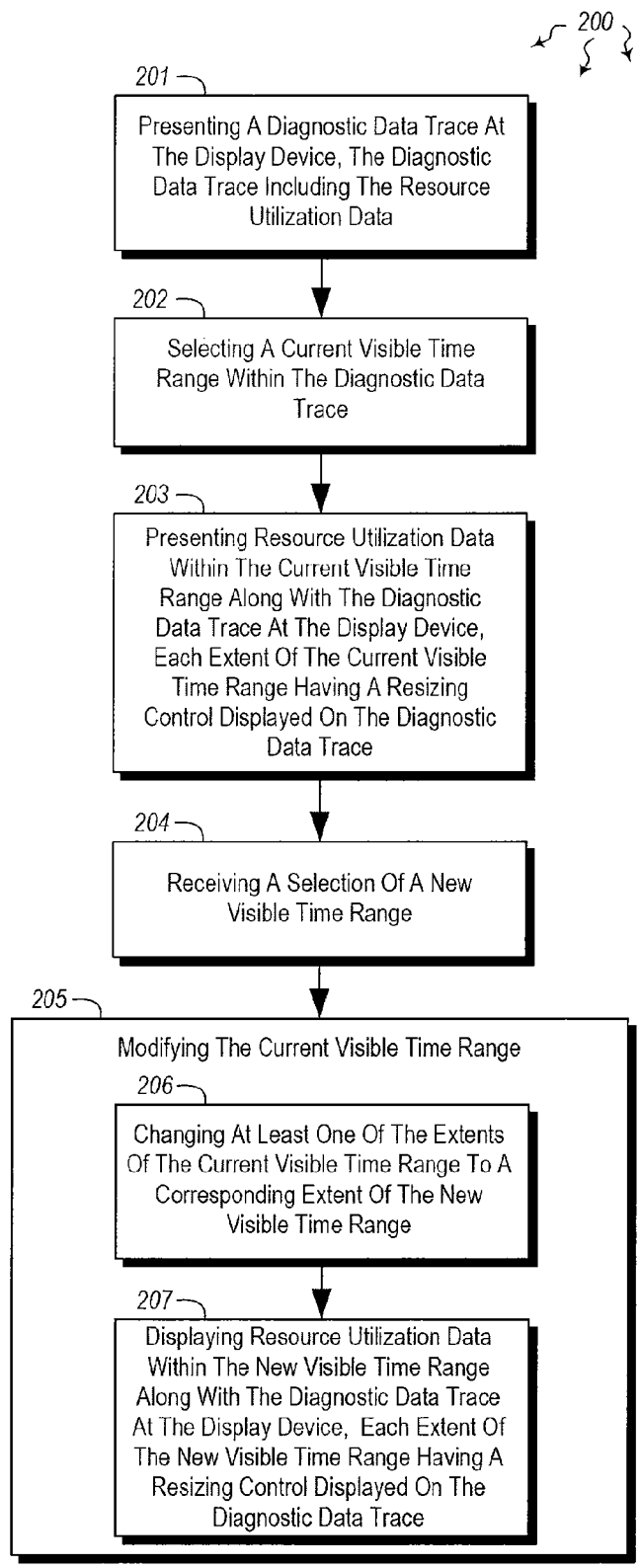
FIG. 2 illustrates a flow chart of an example method for time-based navigation within resource utilization data.

FIG. 2 illustrates a flow chart of an example method 200 for time-based navigation within resource utilization data. As method 200 may be performed by navigation module 105 in FIG. 1, method 200 will now be described with frequent reference to computer architecture 200 of FIG. 2.

Method 200 includes an act of presenting a diagnostic data trace at a display device, the diagnostic data trace including the resource utilization data (act 201). For example, navigation module 105 can display portions of diagnostic data trace 108. Portions can be evenly spaced and marked with time intervals. In some embodiments, resource utilization data 106 are color coded. Color coding can include assigning different presentation colors to resource utilization data corresponding to different components 101. For example, the utilization data generated by the CPU may be marked as red and the utilization data generated from the GPU may be marked as green.

Method 200 includes an act of selecting a current visible time range within diagnostic data trace (act 202). For example, a user can select and submit time range 102A to navigation module 105. To select the current visible time range, the user may input the start and end value of the current visible time range. For example, the user may simply input "12000" and "12300" to select the time range from 12000 milliseconds to 12300 milliseconds. Alternatively, the user may press the mouse at a desired start position at the diagnostic data trace, drag it to a desired end position, and then release the mouse.

Method 200 includes an act of presenting resource utilization data within the current visible time range along with the diagnostic data trace at display device, each extent of the current visible time range having a resizing control displayed on the diagnostic data trace (act 203). For example, receiving a selected current visible time range 102A from the user, navigation module 105 presents extents of selected time range 110 and diagnostic data trace within selected time range 112 along with diagnostic data trace 108 at the display device. Each extent of the current visible time range has a resizing control displayed on the diagnostic data trace. As one embodiment, the resizing control may be shaped as a small red rectangle so that the user may easily click the resizing control.

The diagnostic data trace within the current visible time range is visually distinguished from the diagnostic data trace outside the current visible time range. For example, in one embodiment, the diagnostic data trace within the current visible time range may be filled with red and the diagnostic data trace outside the current visible time range may be filled with light pink (although other combinations of visually distinguishing indicators [color, size, shape, etc.] are also possible). The extents of the current visible time range can also be displayed with marks indicating the start and end value of the extents.

In some embodiments, when the current visible time range is selected, the resource utilization data corresponding to each of components 101 are displayed in different data traces in greater details. Multiple ticks spaced evenly indicating the time interval and marks indicating the start time and end time of the current visible time range are displayed along the different traces.

Method 200 includes an act of receiving a selection of a new visible time range (act 204). For example, the user may reselect and submit time range 102B to navigation module 105 since the user's interest in different portions of the resource utilization data might change over time.

Method 200 includes an act of modifying the current visible time range in response to the selection of new visible time range (act 205). The act of modifying the current visible time range further including an act of changing at least one of the extents of current visible time range to a corresponding extent of the new visible time range (act 206) and an act of displaying resource utilization data within new visible time range along with the diagnostic data trace at the display device, each extent of the new visible time range having a resizing control displayed on the diagnostic data trace (act 207). For example, when navigation module 105 receives new time range 102B, navigation module 105 submits extents of selected time range (based on time range 102B) 114 and diagnostic data trace within selected time range (based on time range 102B) 116 to display device 109. In response to the selection of the new visible time range, navigation module 105 may modify the current visible time range. In modifying the current visible time range, based on the requests from the user, navigation module 105 may change one or more of the extents of the current visible time range or pan and zoom the current visible time range.

In some embodiments, in changing the extents of the current visible time range, the user may click the resizing control of one extent and drag the extent to a desired position. Alternatively, the user may use a keyboard arrow key to move the extent after click the extent. For example, when the user clicks the resizing control of the left extent, the user may use "←" key to change the current visible time range (from 12000 to 12300 milliseconds) to a new visible time range (from 11800 to 12300 milliseconds).

In some embodiments, in panning the current the visible time range, the user may click an area outside the current visible time range but within the diagnostic data trace to move the center of the current visible time range to the position where clicking occurred. The user may also click an area within the current visible time range and drag the current visible time range to a desired position. Alternatively, the user may also use a keyboard arrow key to move the current visible time range after click the current visible time range. In addition, the user may simply input the start and end value of the new visible time range. For example, the user may input new start value and end value as "11000" and "17000" to select a new visible time range from 11000 to 17000 milliseconds.

The navigation module then may display the resource utilization data within the new visible time range. Similarly, the new visible time range is displayed along with the diagnostic data trace and each extent of the new visible time range has a resizing control displayed on the diagnostic data trace.

Figure 3:
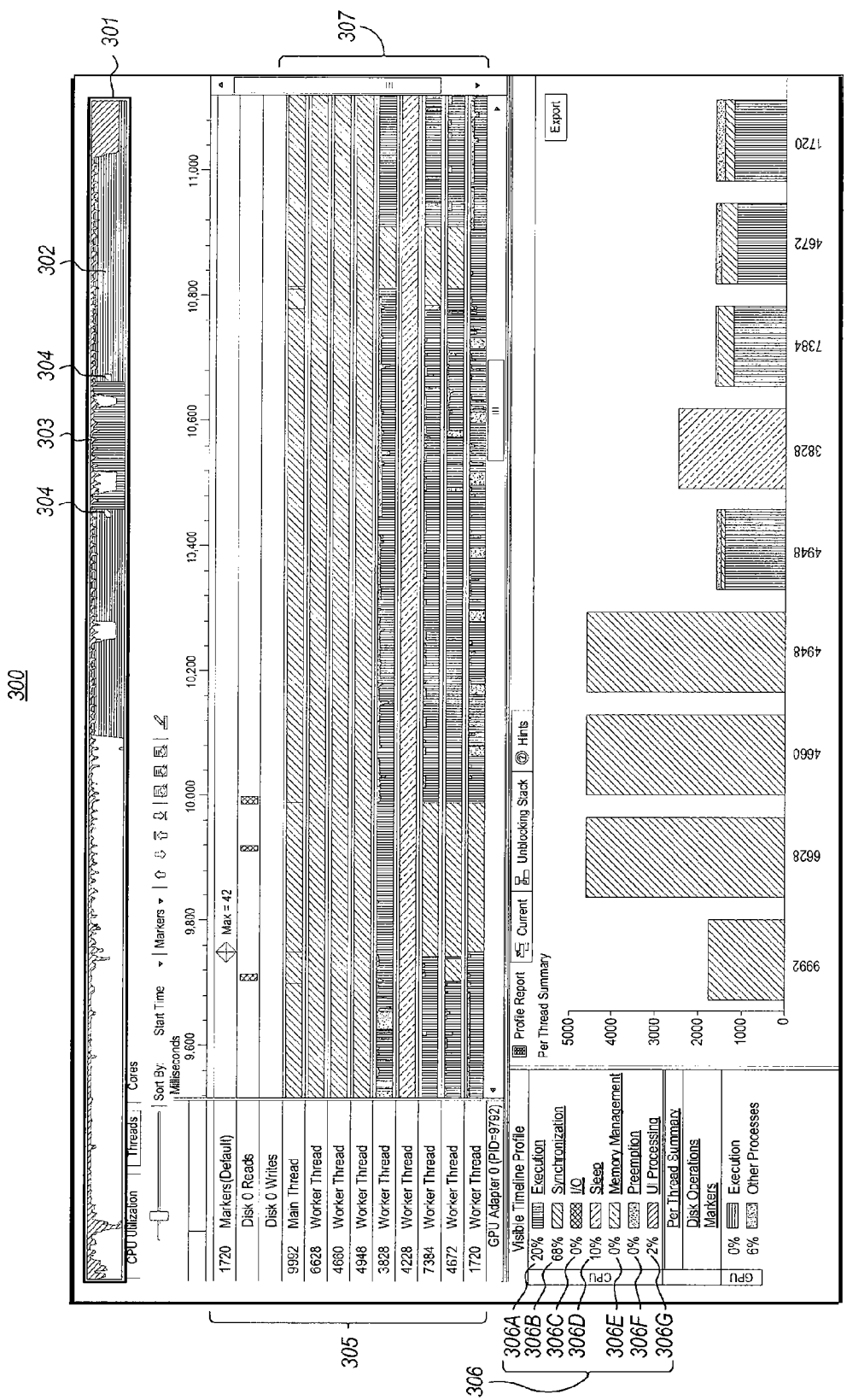
FIG. 3 illustrates a screen shot of an example user interface that facilitates time-based navigation within resource utilization data.

FIG. 3 illustrates a screen shot of an example user interface 300 at the display device of FIG. 1 when example computer architecture 100 performs example method 200. User interface 300 will be described with respect to the acts of Method 200 and elements of computer architecture 100.

In some embodiments, as depicted in FIG. 3, the user interface may display diagnostic data trace 301 at the top of the screen. Resource utilization data 302 may be displayed in a color (e.g., green) within diagnostic data trace 301. Upon selection of the current visible time range, rectangular box 303 or other symbols may be displayed to indicate the current visible time range. The rectangular box may be in a color visually distinguishable with the color of the resource utilization data. Each extent of the current visible time range has resizing control 304 that may be in a form of thumb. Meanwhile, the resource utilization data within the current visible time range (i.e., within the rectangular box) may be in a color substantially different from the color of the extents of the current visible time range and the color of the resource utilization data outside the time range.

Upon determination of the current visible time range, the detail resource utilization data of each corresponding components within the time range may be displayed as multiple traces 307 below diagnostic data trace 301. In one embodiment, the names and IDs 305 of the components may be displayed beside multiple traces 307.

In some embodiments, different performances 306 may be assigned with different presentation colors, 306A, 306B, 306C, 306D, 306E, 306F, 306G. For example, execution of applications may be assigned with red and synchronizations may be green.

Figure 4:
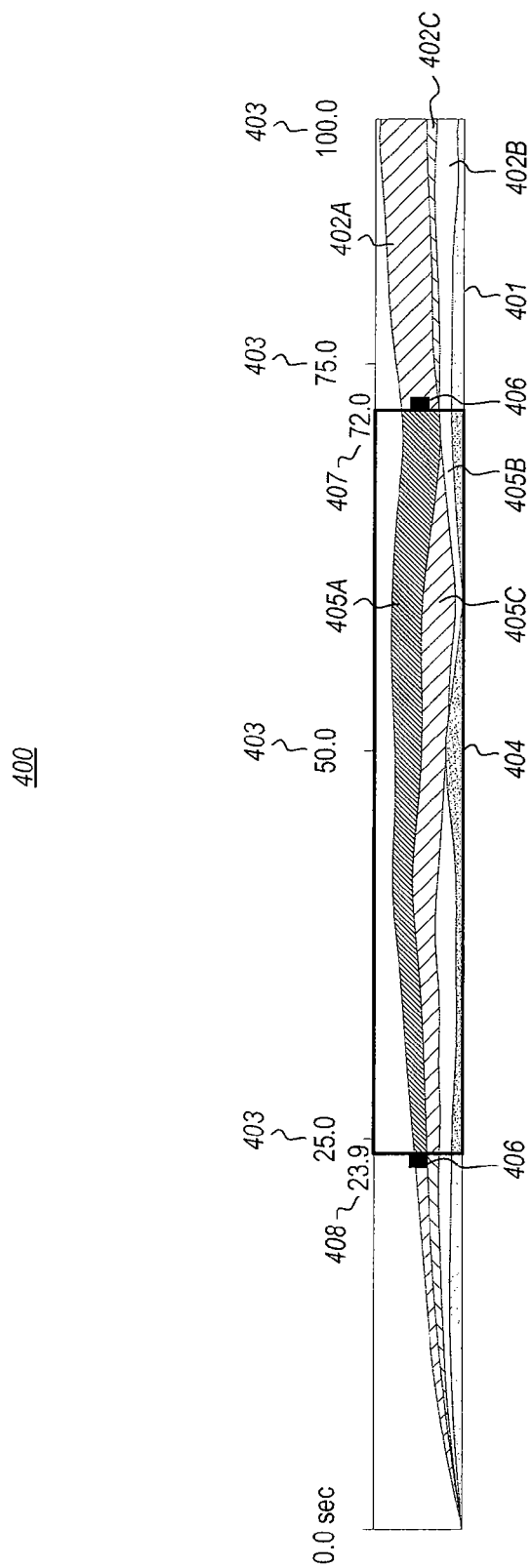
FIG. 4 illustrates an example screen shot of the diagnostic data trace displayed with a selected time range.

FIG. 4 illustrates an example screen shot of the diagnostic data trace displayed with a selected time range. As the diagnostic data trace and the selected time range may be generated by navigation module 105, screen shot 400 will now be described with frequent reference to computer architecture 200 of FIG. 2.

As depicted, resource utilization data may be displayed at a diagnostic data trace. Multiple ticks 403 may be displayed and evenly spaced to indicate the total length of the diagnostic data trace is 100.0 seconds and the diagnostic data trace is evenly divided by the ticks into four equal portions. The resource utilization data corresponding to different components 101 may be assigned with different colors, 402A, 402B, and 402C. Although only three colors are showed, this principle described herein may apply to any interface showing more than three different performances. Upon the selection of the current visible time range, current visible time range 404 is displayed at the diagnostic data trace. Each of the extents has a resizing control 406. Resource utilization data within the time range (405A, 405B, 405C) is visually distinguished with the resource utilization data outside the time range. In one embodiment, start time 408 and end time 407 of the current visible time range may be marked.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, the computer system including one or more processors system memory, and a display device, the computer system configured to present resource utilization data representative of performance for an application, the resource utilization data derived from a stream of raw computing activity generated by one or more components during execution of the application, a method for time-based navigating within the resource utilization data, the method comprising:
   an act of presenting a diagnostic data trace at the display device, the diagnostic data trace including the resource utilization data;
   an act of selecting a current visible time range within the diagnostic data trace;
   an act of presenting resource utilization data within the current visible time range along with the diagnostic data trace at the display device, each extent of the current visible time range having a resizing control displayed on the diagnostic data trace;
   an act of receiving a selection of a new visible time range;
   in response to the selection of the new visible time range, an act of modifying the current visible time range, including:
      an act of changing at least one of the extents of the current visible time range to a corresponding extent of the new visible time range; and
      an act of displaying resource utilization data within the new visible time range along with the diagnostic data trace at the display device, each extent of the new visible time range having a resizing control displayed on the diagnostic data trace.

2. The method as recited in claim 1, wherein the act of presenting resource utilization data further comprises an act of displaying the diagnostic data trace within the current visible range in a first color that is visually distinguishable to a second color indicating the diagnostic data trace outside the current visible range.

3. The method as recited in claim 1, wherein the act of modifying the current visible time range comprises an act of one or more of panning and zooming the current visible time range.

4. The method as recited in claim 3, wherein the act of panning the current visible time range comprises an act of clicking an area outside of the current visible time range and within the diagnostic data trace to move the center of the current visible time range to the position where clicking occurred as the new visible time range.

5. The method as recited in claim 3, wherein the act of panning the current visible time range comprises an act of clicking an area within the current visible time range and dragging the current visible time range to a desired position as the new visible time range.

6. The method as recited in claim 3, wherein the act of panning the current visible time range comprises an act of clicking an area within the current visible time range and pressing a keyboard arrow key, wherein pressing the keyboard arrow key causes the current visible time range to move by a specified fraction of the current visible time range as the new visible time range.

7. The method as recited in claim 1, wherein the act of changing at least one of the extents of the current visible time range comprises an act of clicking one of the extents and dragging the extent to a desired position.

8. The method as recited in claim 1, wherein the act of changing at least one of the extents of the current visible time range comprises an act of clicking one of the extents and pressing the keyboard arrow key.

9. The method as recited in claim 1, wherein the act of presenting the resource utilization data during the current visible time range along with the diagnostic data trace further comprises an act of displaying a plurality of ticks along an X-axis of the diagnostic data trace.

10. The method as recited in claim 1, wherein the resource utilization data is color coded, coloring coding including assigning different presentation colors to resource utilization data corresponding to different components included in the one or more components.

11. A computer program product for use at a computer system, the computer system a display device, the computer system configured to present resource utilization data representative of performance for an application, the resource utilization data derived from a stream of raw computing activity generated by one or more components during execution of the application, the computer program product for implementing a method for time-based navigating within the resource utilization data, the computer program product comprising one or more computer-storage media having stored thereon computer-executable instructions that, when executed by a processor, cause the computer system to perform the method including the following:

present a diagnostic data trace at the display device, the diagnostic data trace including the resource utilization data;

select a current visible time range within the diagnostic data trace;

present resource utilization data within the current visible time range along with the diagnostic data trace at the display device, each extent of the current visible range having a resizing control displayed on the diagnostic data trace, wherein the diagnostic data trace within the current visible time range is displayed in a first color that is visually distinguishable to a second color indicating the diagnostic data trace outside the current visible range;

modify the current visible time range to create a new visible time range within the diagnostic data; and display resource utilization data within the new visible time range along with the diagnostic data trace at the display device, each extent of the new visible time range having a resizing control displayed on the diagnostic data trace.

12. The method as recited in claim 11, wherein computer-executable instructions that, when executed, cause the computer system to modify the current visible time range comprise computer-executable instructions that, when executed, cause the computer system to perform one or more of:

pan the current visible time range;

zoom the current visible time range; and change at least one of the extents of the current visible time range to a corresponding extent of the new visible time range.

13. The method as recited in claim 12, wherein computer-executable instructions that, when executed, cause the computer system to pan the current visible time range comprise computer-executable instructions that, when executed, cause the computer system to receive user input indicating selection of an area outside of the current visible time range and within the diagnostic data trace to move the center of the current visible time range to the position where clicking occurred as the new visible time range.

14. The method as recited in claim 12, wherein computer-executable instructions that, when executed, cause the computer system to pan the current visible time range comprise computer-executable instructions that, when executed, cause the computer system to receive user input indicating selection of an area within the current visible time range and drag the current visible time range to a desired position as the new visible time range.

15. The method as recited in claim 12, wherein computer-executable instructions that, when executed, cause the computer system to pan the current visible time range comprise computer-executable instructions that, when executed, cause the computer system to receive user input from a keyboard indicating selection an area within the current visible time range and pressing a keyboard arrow key, the user input from pressing a keyboard arrow key that causes the current visible time range to move by a specified fraction of the current visible time range as the new visible time range.

16. The method as recited in claim 12, wherein computer-executable instructions that, when executed, cause the computer system to change at least one of the extents of the current visible time range comprise computer-executable instructions that, when executed, cause the computer system to receive user input indicating selection of one of the extents with a pointing device and dragging the extent to a desired position.

17. The method as recited in claim 12, wherein computer-executable instructions that, when executed, cause the computer system to change at least one of the extents of the current visible time range comprise computer-executable instructions that, when executed, cause the computer system to receive use input indicating selection of one of the extents and pressing a keyboard arrow key to move the selected extent to a desired position.

18. The method as recited in claim 12, wherein computer-executable instructions that, when executed, cause the computer system to present the resource utilization data during the current visible time range along with the diagnostic data trace further comprise computer-executable instructions that, when executed, cause the computer system to display a plurality of ticks along an X-axis of the diagnostic data trace.

19. The method as recited in claim 12, wherein coloring coding is used to assign different presentation colors to resource utilization data corresponding to different components included in the one or more components and wherein resource utilization data is color coded red.

20. At a computer system, the computer system including one or more processors system memory, and a display device, the computer system configured to present resource utilization data representative of performance for an application, the resource utilization data derived from a stream of raw computing activity generated by one or more components during execution of the application, a method for time-based navigating within the resource utilization data, the method comprising:

an act of presenting a diagnostic data trace at the display device, the diagnostic data trace including the resource utilization data;

an act of selecting a current visible time range within the diagnostic data trace;

an act of presenting resource utilization data within the current visible time range along with the diagnostic data trace at the display device, each extent of the current visible time range having a resizing control displayed on the diagnostic data trace, wherein the diagnostic data trace within the current visible time range is displayed in a first color that is visually distinguishable to a second color indicating the diagnostic data trace outside the current visible range;

an act of receiving a selection of a new visible time range;

in response to the selection of the new visible time range, an act of modifying the current visible time range, including:

an act of panning the current visible time range, including:

an act of receiving user input selecting an area outside of the current visible time range and within the diagnostic data trace to move the center of the current visible time range to a position corresponding to the selected area; and an act of receiving user input selecting an area within the current visible time range; and an act of moving the current visible time range to a desired position as the new visible time range; and an act of changing at least one of the extents of the current visible time range to a corresponding extent of the new visible time range, including:

an act of receiving user input selecting one of the extents;

an act of receiving an indication of keyboard arrow key being pressed;

an act of dragging the extent to a desired position in response to the keyboard arrow key being pressed; and an act of displaying resource utilization data within the new visible time range along with the diagnostic data trace at the display device, each extent of the new visible range having a resizing control displayed on the diagnostic data trace.

\* \* \* \* \*